(12) United States Patent
Vidal

(10) Patent No.: US 10,876,642 B2
(45) Date of Patent: Dec. 29, 2020

(54) NON-DRIPPING SLIDING DIVERTER VALVE

(76) Inventor: Freddy Vidal, Chatsworth, CA (US)

( * ) Notice: Subject to any disclaimer, the term of this patent is extended or adjusted under 35 U.S.C. 154(b) by 428 days.

(21) Appl. No.: 12/758,750

(22) Filed: Apr. 12, 2010

(65) Prior Publication Data
US 2011/0248202 A1 Oct. 13, 2011

(51) Int. Cl.
F16K 11/065 (2006.01)
F16K 11/07 (2006.01)

(52) U.S. Cl.
CPC .... F16K 11/0716 (2013.01); C02F 2301/043 (2013.01); C02F 2307/06 (2013.01)

(58) Field of Classification Search
CPC ............. F16K 11/0712; F16K 11/0716; E03C 2201/30; E03C 2201/40
USPC .......................... 137/625.18, 625.48, 625.49
See application file for complete search history.

(56) References Cited

U.S. PATENT DOCUMENTS 5,279,329 A * 1/1994 Pippel ...................... 137/625.29
6,135,154 A * 10/2000 Chen ...................... B01D 35/04
                                                      137/625.29
6,557,587 B1 * 5/2003 Chiu ............................. 137/801
8,746,283 B2 * 6/2014 Koury ................... E03C 1/0404
                                                      137/867
2001/0054447 A1 * 12/2001 Kuo ......................... 137/625.46
2013/0220911 A1 * 8/2013 Pedersen ................ C02F 1/006
                                                      210/254

* cited by examiner

Primary Examiner — Reinaldo Sanchez-Medina
(74) Attorney, Agent, or Firm — Risso I.P.

(57) ABSTRACT

A sliding diverter valve. The value includes a body portion with a bore having a diameter, an untreated fluid inlet, an untreated fluid spigot outlet, an untreated fluid diverter outlet, a treated fluid inlet, and a treated fluid spigot outlet. The valve further includes a slider which slides in the bore of the body portion and which, (a) in a first, untreated fluid position, directs untreated fluid to flow from the untreated fluid inlet to the untreated fluid spigot outlet and which blocks any fluid from exiting the untreated fluid diverter outlet and any treated fluid from entering the treated fluid inlet, and (b) in a second, treated fluid position, directs untreated fluid to flow from the untreated fluid inlet to the untreated fluid diverted outlet and which blocks any fluid from exiting the untreated fluid spigot outlet, and permits treated fluid to flow into the treated fluid inlet and out of the treated fluid spigot outlet.

12 Claims, 3 Drawing Sheets

US 10,876,642 B2

NON-DRIPPING SLIDING DIVERTER VALVE

SUMMARY OF THE INVENTION

The invention relates to valves, and more particularly to a non-dripping sliding diverter water valve that can be used with water, other liquids, flowable solids or gels, and/or gases.

The use of water filtration and treatment system in home and commercial setting, such as in restaurants and other hospitality settings, has expanded in recent years as concerns about water quality have increased. These water filtration and treatment systems can include one or more of particulate filters, carbon filters, ionic filters, UV lights, and reverse osmosis treatment to name a few. More recently, many types of water treatment systems have been introduced that provide water having different pHs, different water cluster size, and other properties.

Regardless of how water is treated, water treatment systems include equipment that must be positioned somewhere. Some users will opt to install completely self-contained water filtration systems that have water supplied to the system from an under the sink location, e.g., tapped in from the cold water supply pipe that feeds the faucet from under the sink. In these completely self-contained water treatment systems, the treatment equipment is typically located below the countertop level, e.g., such as under the sink, in a closet, under the kitchen floor, etc., and a treated water spigot is provided on the countertop or sink rim which delivers the treated water. Water supply lines and drain lines and hoses are thereby hidden from view at the countertop level and more countertop space and less countertop clutter results. However, these systems must typically be installed by a plumber or skilled do-it-yourselfer.

In contrast with under sink types of water treatment systems, there numerous types of water treatment systems that sit at the countertop level and derive their supply of untreated tap water directly from the spigot of a water faucet. The majority of these water treatment systems include filters and or other components that remain under pressure even after water to be treated stops flowing into the system from the faucet spigot. In many of these countertop water treatment systems, a diverter valve is provided which screws onto the end of the faucet's spigot and has two operating valve positions. In a first diverter valve position, tap water is directed to flow out of a first tap water outlet of the diverter valve (a tap water position). In a second diverter valve position, treated water is directed to flow from a second, treated water outlet of the diverter valve (a treated water position). In the tap water position, the water treatment system will not be used, and untreated tap water will flow out of the faucet's spigot through the first tap water outlet of the attached diverter valve. In the treated water position, tap water is selectively diverted to a tap water outlet which feeds the redirected untreated tap water via a tap water hose to the water treatment systems where the tap water is treated. From the water treatment system, treated water travels via a treated water hose into a treated water inlet of the diverter valve, and then out of the second, treated water outlet on the diverter valve. For reasons discussed below, the designs of currently available diverter valves allow treated water to drip from their treated water outlets even after the diverter valve is changed from the treated water position back to the tap water position. This results in treated water in the water treatment system flowing out of the treated water outlet of the diverted valve. This is both wasteful of water and is bothersome to users who can see and hear the dripping.

DETAILED DESCRIPTION OF THE INVENTION

Figure 1:
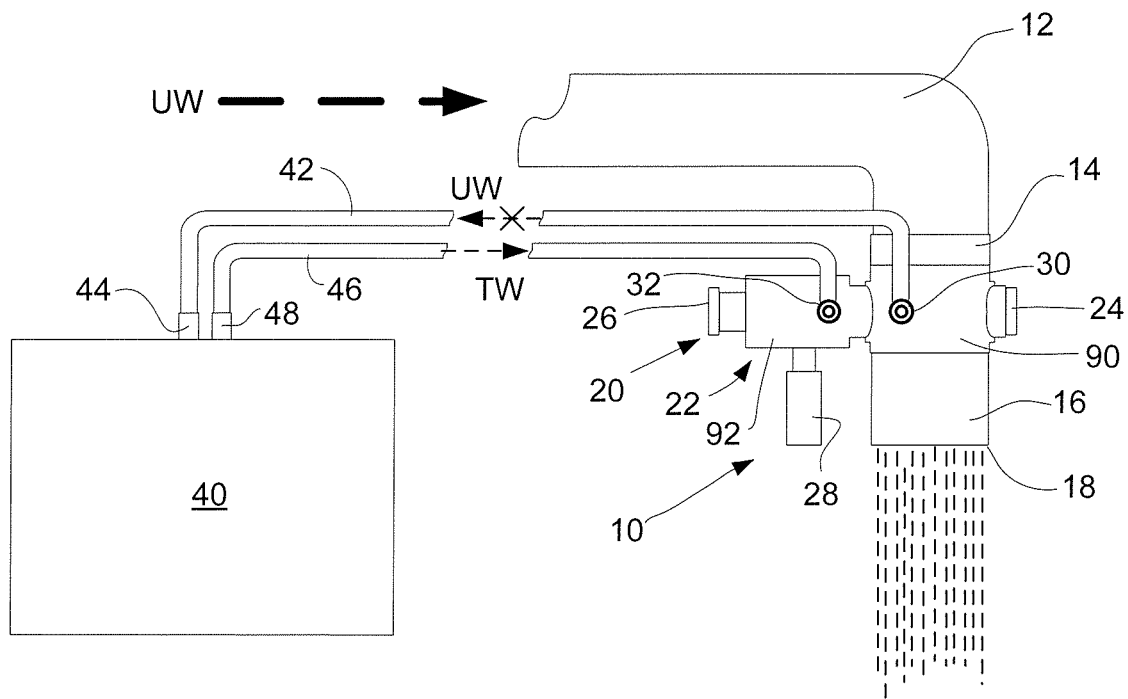
FIG. 1 is a side view of an exemplary embodiment of a sliding diverter valve of the invention shown connected to a faucet's spigot and a water treatment system, with the sliding diverter water valve in its untreated tap water flow position.

FIG. 1 is a side view of an exemplary embodiment of a sliding diverter valve 10 of the invention shown connected to a faucet's spigot 12 via a threaded spigot attachment ring 14 in an untreated tap water flow position. The sliding diverter valve is shown with an aerator 16 through which untreated water UW exits through a tap water outlet 18 of the sliding diverter valve 10. A slider 20 which is slideably positioned in a body portion 22 of the sliding diverter valve 10 is used to control how water (both untreated water UW and treated water TW) flow and/or are stopped from flowing through the sliding diverter valve 10. The slider 20 has a untreated water UW button 24 and a treated water TW button 26. A treated water TW spigot 28 extends from a treated water TW portion 92 of the body portion 22. An untreated water UW outlet 30 extends from the tap water spigot portion 90 of the body portion 22 and a treated water TW inlet 32 extends from the treated water TW portion 92 of the body portion 22. The untreated water UW outlet 30 is used to direct untreated water UW from the sliding diverter valve 10 to a water treatment system 40. Tap water hose 42 connects between the untreated water UW outlet 30 of the sliding diverter valve 10 and a tap water inlet 44 of the water treatment system 40. Treated water hose 46 connects between a treated water outlet 48 of the water treatment system 40 and the treated water TW inlet 32 of the sliding diverter valve 10.

When the slider 20 is slid so that its untreated water UW button 24 is pushed against the tap water spigot portion 90 of the body portion 22, with the treated water TW button 26 extending away from the treated water TW portion 92 of the body portion 22, untreated water UW, i.e., plain tap water, will flow out of the tap water outlet 18 of the sliding diverter valve 10. In this untreated tap water flow position, untreated water UW will be prevented from exiting the untreated water UW outlet 30 and entering the water treatment system, and treated water from the water treatment system 40 will be prevented from entering the sliding diverter valve 10 through the treated water inlet TW 32. Therefore, when sliding diverter valve 10 is in its untreated tap water flow position, treated water will be prevented from flowing or dripping out of the diverted valve 10.

Figure 2:
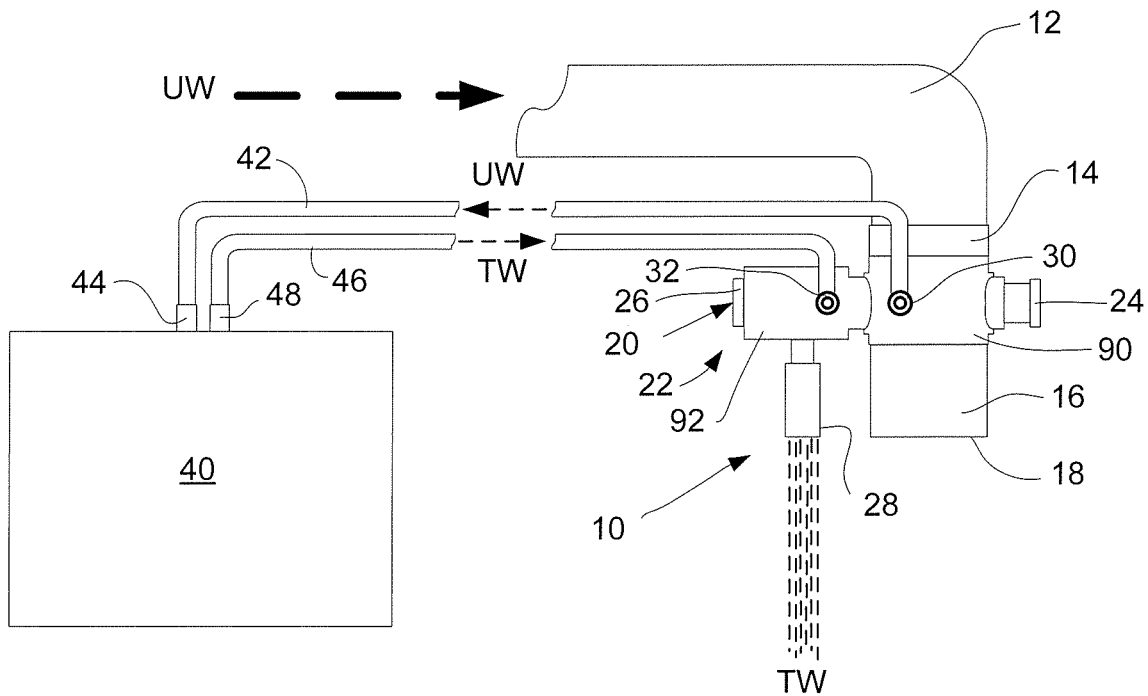
FIG. 2 is a side view of the exemplary embodiment of the diverter valve of the invention shown connected to a faucet's spigot and a water treatment system, with the sliding diverter water valve in its treated water flow position.

FIG. 2 is a side view of the exemplary embodiment of the diverter valve 10 of the invention shown connected to a faucet's spigot 12 and a water treatment system 40, with the sliding diverter water valve 10 in its treated water flow position. Other features are as shown and described in FIG. 1 above. In the treated water flow position, the treated water TW button 26 will be pushed against the body portion 22, with the untreated water button 24 extending away from body portion 22 and untreated water UW will be stopped from flowing out of the tap water outlet 18 of the sliding diverter valve 10, and will instead be directed to flow out of the untreated water UW outlet 30, through the tap water hose 42 and to the tap water inlet 44 of the water treatment system 40. The water treatment system 40 will treat the untreated water UW and convert it to treated water TW. From there, the treated water TW will flow out of the treated water outlet 48, through the treated water hose 46 connected to treated water inlet TW 32 of the sliding diverter valve 10, and flow unimpeded out of the treated water TW outlet 28. Further details describing how the exemplary sliding diverter valve 10 of the invention does this is better described with references to FIGS. 3-7 below.

Figure 3:
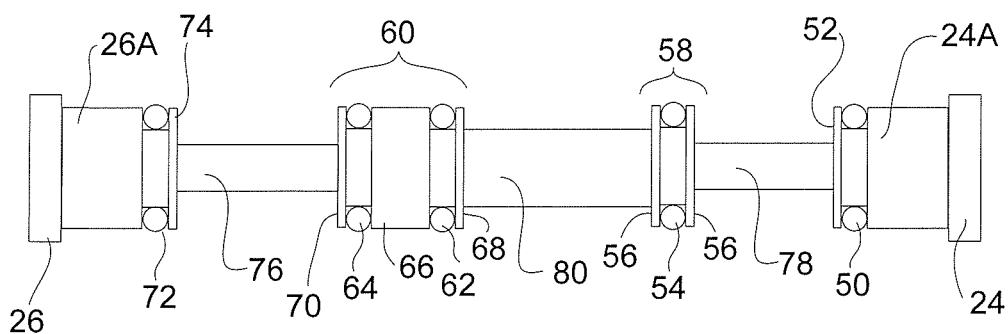
FIG. 3 is a side view of a slider of the exemplary sliding diverter water valve of the invention.

FIG. 3 is a side view of an exemplary embodiment of a slider 20 of the exemplary sliding diverter water valve 10 of the invention. The slider 20 has the untreated water UW button 24 at one end and the treated water TW button 26 at the other end. For purposes of assembling the slider 20 with the body portion 22 (shown in FIGS. 6 and 7), the untreated water UW button 24 and/or the treated water TW button 26 can be screwed onto collars 24A and 26A, respectively. For ease of assembly, the slider portion 20 can be formed from a single piece of material (e.g., brass, stainless steel, etc.) with the untreated water UW button 24 and the treated water TW button 26 being attachable thereto, e.g., by the untreated water UW button 24 and the treated water TW button 26 having male threaded extensions (not shown) which are screwed into threaded holes (not shown) formed in the collars 24A and 26A, respectively. An O-ring 50 is positioned by a keeper 52 next to the untreated water UW button 24 and collar 24A, and is provided to prevent water from leaking out of the body portion 22 when the slider 20 is engaged therewith, as shown in FIGS. 1, 2, 6 and 7. A tap water flow O-ring 54 and its keepers 56 comprise an untreated water UW control section 58, and are positioned to the left of O-ring 50, and control the flow direction of untreated water UW through the body portion, as will be described below. To the left of untreated water UW control section 58 is treated water TW inlet control section 60, which comprises O-rings 62 and 64, which are separated by spacer 66 and are retained by retainers 68 and 70. To the left of treated water TW inlet control section 60 is O-ring 72 retained by retainer 74 next to collar 26A, and is provided to prevent water from leaking out of the body portion 22 when the slider 20 is engaged therewith, as shown in FIGS. 1, 2, 6 and 7. The treated water TW inlet control section 60 bridges toward retainer 74 by a smaller diameter rod section 76, and a smaller diameter rod section 78 bridges between keeper 52 and untreated water UW control section 58. A larger diameter rod section 80 bridges between untreated water UW control section 58 and treated water TW inlet control section 60. The significance of the spacing between O-rings 62 and 64 and the layout of the untreated water UW control section 60 and treated water TW inlet control section 60 will be described further below. In lieu of O-rings, other sealing devices or means can be used.

Figure 4:
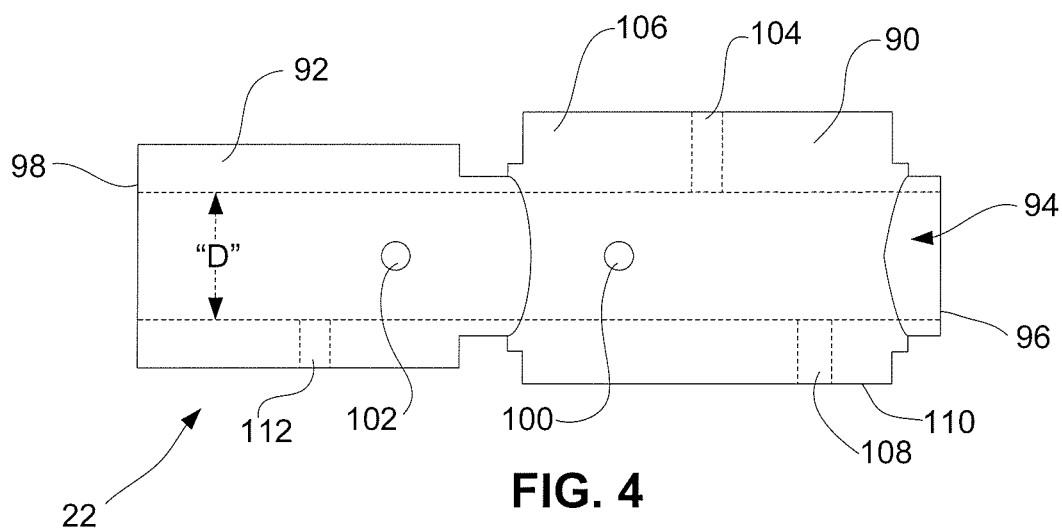
FIG. 4 is a side view of the body portion of the exemplary sliding diverter water valve of the invention with its channels and openings being shown, with its threaded spigot attachment ring and its aerator removed.
Figure 5:
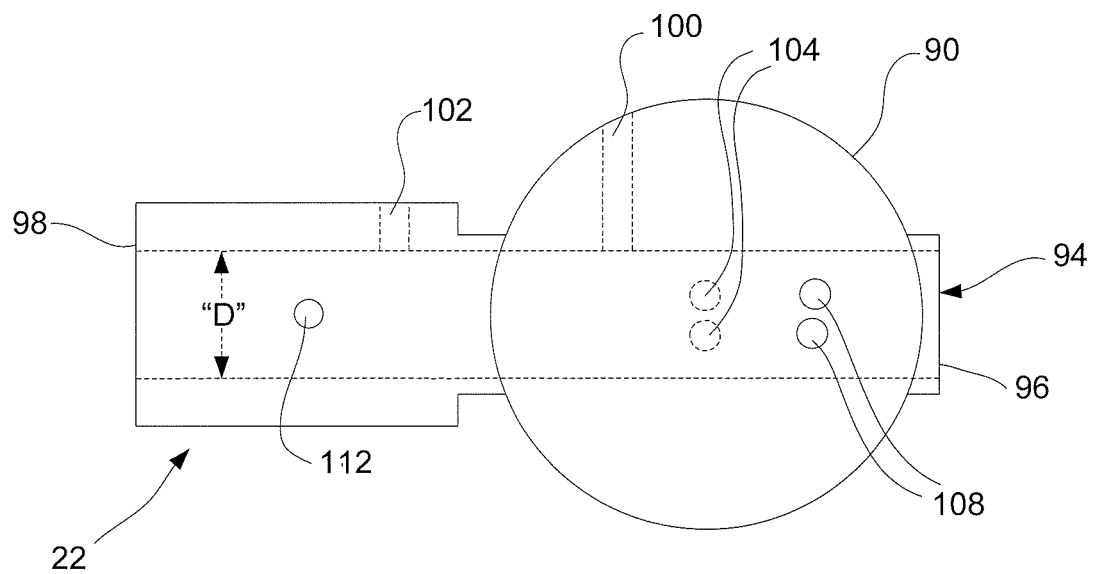
FIG. 5 is a top view of the body portion of the exemplary sliding diverter water valve of the invention with its channels and openings being shown, with its threaded spigot attachment ring and its aerator removed.

FIG. 4 is a side view and FIG. 5 is a top view of the body portion 22 of the exemplary sliding diverter water valve of the invention with its channels and openings being shown. Not shown in FIGS. 4 and 5 is the threaded spigot attachment ring 14 (which is rotatably attached to upper portion of the tap water spigot portion 90), or an aerator 16, shown extending below the lower portion of the tap water spigot portion 90. As noted above, the body portion 22 has the tap water spigot portion 90 and the treated water TW portion 92. A bore 94 of constant diameter "D" is formed through the body portion 22, and the bore 94 is sized so that the O-rings 50, 54, 62, 64, and 72 of the slider 20 will make water tight and sliding contact therewith. The bore 94 has a front 96 and a rear 98. The untreated water UW outlet 30 (shown in FIGS. 1 and 2) connects to a tap water aperture 100 formed into the tap water spigot portion 90 and fluidly communicates with the bore 94. The treated water TW inlet 32 (shown in FIGS. 1 and 2) connects to a treated water aperture 102 formed into the treated water TW portion 92 and fluidly communicates with the bore 94. One or more tap water inlet holes 104 pass from a top 106 of the tap water spigot portion 90 and communicates with the bore 94, and one or more tap water outlet holes 108 extend from the underside 110 of the tap water spigot portion 90 to the bore 94. The tap water outlet holes 108 are offset closer to the front 96 of the bore 94 than are the tap water inlet holes 104. A treated water outlet bore 112 extends from the outside of the treated water TW portion 92 and communicates with the bore 94. The treated water TW spigot 28 is fluidly connected with the treated water outlet bore 112.

Figure 6:
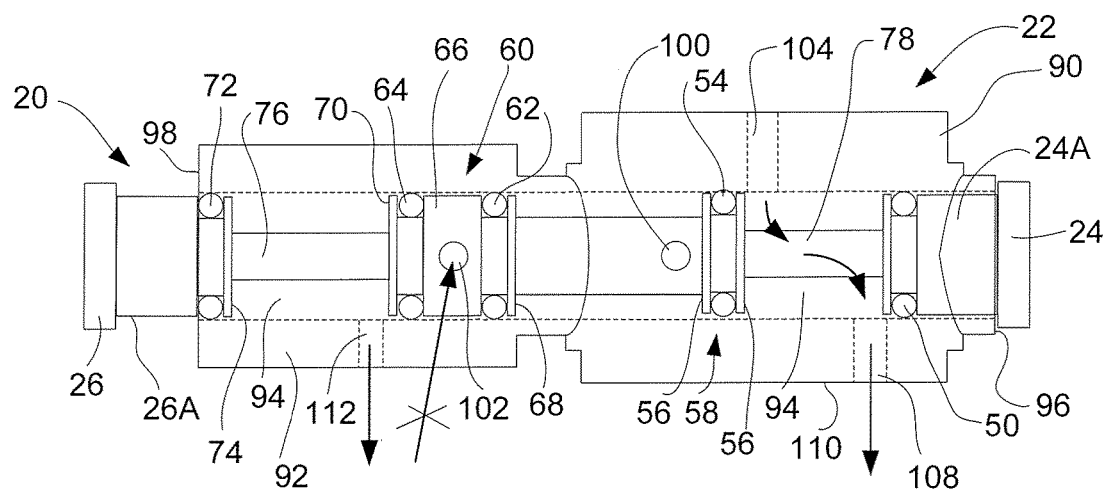
FIG. 6 is an exposed side view of the assembled sliding diverter water valve of the invention, with the slider shown in its untreated tap water flow position.

FIG. 6 is a side view of the assembled sliding diverter water valve 10 of the invention, with the slider 20 shown positioned in the body portion 22 in its untreated tap water flow position, with its untreated water UW button 24 is pushed against the end 96 of the tap water spigot portion 90 of the body portion 22, and with the treated water button 26 extending away from the end 98 of the treated water TW portion 92 of the body portion 22. In this position, the O-rings 50 and 72 near the untreated water UW button 24 and the treated water TW button 26, respectively, prevent water from leaking out of the bore 94 of the body portion 22 through terminal ends. Also, in this position, the tap water flow O-ring 54 and its keepers 56 of the untreated water UW control section 58 will be located to the left of tap water inlet holes 104. Therefore, tap water flowing from the faucet will flow down through the tap water inlet holes 104 and will not be permitted to flow to the left in the central bore 94 (and will not be permitted to flow out of the tap water aperture 100 formed into the tap water spigot portion 90) and accordingly will be directed to flow down and out through the tap water outlet holes 108 extending from the underside 110 of the tap water spigot portion 90. The smaller diameter rod section 78, which is much smaller than the diameter "D" of the central bore 94 will be located in the region of the central bore 94 that communicates between the tap water inlet holes 104 and the tap water outlet holes 108, and will thus allow free flow of tap water out through tap water outlet 108. Moreover, in this tap water position, the treated water TW inlet control section 60 and its O-rings 62 and 64, which are separated by spacer 66 and retained by retainers 68 and 70, will block access to the treated water aperture 102 formed into the treated water TW portion 92. This will prevent any treated water from the water treatment system 40 through the treated water hose 46 (shown in FIG. 1) from entering the sliding diverter valve 10. Thus, no additional treated water will enter the sliding diverter valve 10, and there will thus be no dripping of treated water in this tap water position from the treated water outlet bore 112 and out through the treated water spigot 28 (as shown in FIG. 1). The diameter of the spacer 66 is slightly smaller than the diameter D of the central bore 94, and can further aid in blocking the entry of treated water to the sliding diverter valve 10. When the slider 20 is slid so that untreated water UW, i.e., plain tap water, will flow out of the tap water outlet 108 of the sliding diverter valve 10. In this untreated tap water flow position, untreated water UW will be both prevented from exiting the untreated water UW outlet 30 through the treated water aperture 102 and entering the water treatment system, and treated water from the water treatment system 40 will be prevented from entering the treated water inlet TW 32 through the tap water aperture 100 of the sliding diverter valve 10. Therefore, when sliding diverter valve 10 is in its untreated tap water flow position, treated water will be prevented from flow or drip out of the treated water spigot 28 of the diverted valve 10.

Figure 7:
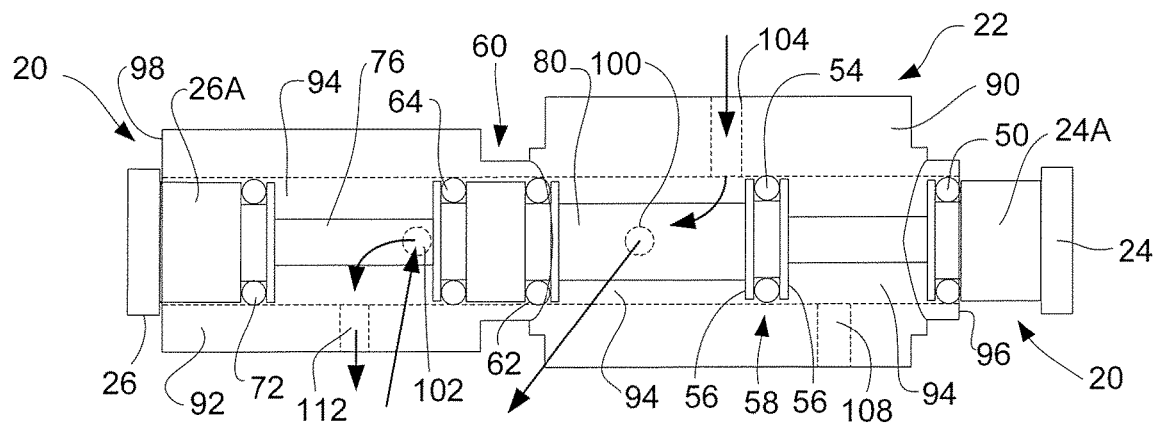
FIG. 7 is an exposed side view of the assembled sliding diverter water valve of the invention, with the slider shown in its treated water flow position.

FIG. 7 is a side view of the exemplary embodiment of the assembled sliding diverter water valve 10 of the invention, with the slider 20 shown positioned in the body portion 22 in its treated water flow position, with its treated water UW button 26 is pushed against the end 98 of the treated water TW portion 92 of the body portion 22, and with the untreated water button 24 extending away from the end 96 of the tap water spigot portion 90 of the body portion 22. As in all positions, the O-rings 50 and 72 near the untreated water UW button 24 and the treated water TW button 26, respectively, prevent water from leaking out of the bore 94 of the body portion 22 through its terminal ends. In this position, the tap water flow O-ring 54 and its keepers 56 of the untreated water UW control section 58 will be located to the right of tap water inlet holes 104. Therefore, tap water flowing from the faucet will flow down through the tap water inlet holes 104 and will not be permitted to flow to the right in the central bore 94 (and will not be permitted to flow out of the out through the tap water outlet holes 108 formed into the tap water spigot portion 90) and accordingly will be directed to flow to the left in the central bore 94. The diameter of the rod section 80 that bridges between untreated water UW control section 58 and treated water TW inlet control section 60 is sufficiently smaller than the diameter D of the central bore 94, and so tap water will flow out through the tap water aperture 100 formed into the tap water spigot portion 90. Thus, tap water from the faucet will now be flowing through the sliding diverter valve 10 and out through the tap water hose 42 that connects between the untreated water UW outlet 30 (shown in FIG. 2) of the sliding diverter valve 10 and to the tap water inlet 44 of the water treatment system 40. The treated water will then flow through the treated water hose 46 to the treated water inlet 32 of the sliding diverter valve 10 (shown in FIG. 2) and through the treated water aperture 102 formed into the treated water TW portion 92. The smaller diameter rod section 76, which is much smaller than smaller than the diameter "D" of the bore 94 will be located in the region of the bore 94 that communicates between the treated water aperture 102 and the treated water outlet bore 112. Moreover, in this treated water position, the treated water TW inlet control section 60, which includes O-rings 62 and 64, will prevent treated water from flowing to the right in the bore 94. Thus, treated water can only flow out the treated water spigot 28 (as shown in FIG. 2).

While the sliding diverter valve of the invention has been described for using is directing tap water and treated water, the sliding diverter valve can be used to direct the flow of any liquid, flowable gel or solid, or gas, and wherever the terms "tap water" or "treated fluid are used can encompass any first flowable material and wherever the terms "treated water" or "treated fluid are used can encompass any first flowable material that have been redirected out of the sliding diverter valve and redirected back into the diverter valve, respectively. Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive.

What is claimed is:

1. A sliding diverter valve, comprising:
a body portion with a bore having a diameter, an untreated fluid inlet, an untreated fluid spigot outlet, an untreated fluid diverter outlet, a treated fluid inlet, and a treated fluid spigot outlet which all connect with the bore;
a slider which slides in the bore of the body portion and which, (a) in a first, untreated fluid position, directs untreated fluid to flow from the untreated fluid inlet to the untreated fluid spigot outlet and which blocks any fluid from exiting the untreated fluid diverter outlet and any treated fluid from entering the treated fluid inlet, and (b) in a second, treated fluid position, directs untreated fluid to flow from the untreated fluid inlet to the untreated fluid diverter outlet and which blocks any fluid from exiting the untreated fluid spigot outlet, and permits treated fluid to flow into the treated fluid inlet and out of the treated fluid spigot outlet; and
wherein the slider comprises an elongate member and a treated fluid inlet control sealing member; and
wherein the treated fluid inlet control sealing member comprises two O-rings that are spaced apart by a spacer that has a diameter slightly smaller than the diameter of the bore in the body portion, and wherein when the slider is in (a) the first, untreated fluid position in the body portion, the two O-rings of the treated fluid inlet control sealing member will straddle the treated fluid inlet of the body portion and block any treated fluid from entering the treated fluid inlet, and an untreated fluid control sealing member will be positioned in the bore between the untreated fluid inlet and the untreated fluid diverter outlet, and wherein when the slider is in (b) the second, treated fluid position, the two O-rings of the treated fluid inlet control sealing member will uncover the treated fluid inlet and be positioned between the treated fluid inlet and the untreated fluid diverter outlet, and the untreated fluid control sealing member will be positioned in the bore between the untreated fluid inlet and the untreated fluid spigot outlet.

2. The sliding diverter valve of claim 1, wherein the elongate member further comprises a first and second terminal end with buttons positioned thereon, and having spaced apart sealing members for fluid tightly sealing between the elongate member and the bore in the body portion, the sealing members including the untreated fluid control sealing member spaced away from the first terminal end, and the treated fluid inlet control sealing member spaced away from the second terminal end.

3. The sliding diverter valve of claim 2, wherein the sealing members further comprise a first terminal sealing member located near the first terminal end and a second terminal sealing member located near the second terminal end.

4. The sliding diverter valve of claim 2, wherein sections of the elongate member bridging between the first terminal sealing member and the untreated fluid control sealing member and bridging between the second terminal sealing member and the treated fluid inlet control sealing member have a smaller profile than the diameter of the bore in the body portion, and wherein a section of the elongate member bridging between the untreated fluid control sealing member and the treated fluid inlet control sealing member have a smaller profile than the diameter of the bore in the body portion.

5. The sliding diverter valve of claim 2, wherein the sliding diverter valve is moved between the first, untreated fluid position and the second, treated fluid position by pushing on the buttons at the first terminal end and at the second terminal end, respectively.

6. The sliding diverter valve of claim 2, further comprising hose fittings positioned at the untreated fluid diverter outlet and at the treated fluid inlet.

7. The sliding diverter valve of claim 2, further comprising a threaded spigot attachment ring.

8. A sliding diverter valve, comprising:
a body portion with a bore having a diameter, an untreated water inlet, an untreated water spigot outlet, an untreated water diverter outlet, a treated water inlet, and a treated water spigot outlet which all connect with the bore; and
a slider which slides in the bore of the body portion and which, (a) in a first, untreated water position, directs untreated water to flow from the untreated water inlet to the untreated water spigot outlet and which blocks any water from exiting the untreated water diverter outlet and any treated water from entering the treated water inlet, and (b) in a second, treated water position, directs untreated water to flow from the untreated water inlet to the untreated water diverter outlet and which blocks any water from exiting the untreated water spigot outlet, and permits treated water to flow into the treated water inlet and out of the treated water spigot outlet;
wherein the slider comprises an elongate member and a treated water inlet control sealing member; and
wherein the treated water inlet control sealing member comprises two O-rings that are spaced apart by a spacer that has a diameter slightly smaller than the diameter of the bore in the body portion, and wherein when the slider is in (a) the first, untreated water position in the body portion, the two O-rings of the treated water inlet control sealing member will straddle the treated water inlet of the body portion and block any treated water from entering the treated water inlet, and an untreated water control sealing member will be positioned in the bore between the untreated water inlet and the untreated water diverter outlet, and wherein when the slider is in (b) the second, treated water position, the two O-rings of the treated water inlet control sealing member will uncover the treated water inlet and be positioned between the treated water inlet and the untreated water diverter outlet, and the untreated water control sealing member will be positioned in the bore between the untreated water inlet and the untreated water spigot outlet.

9. The sliding diverter valve of claim 8, wherein the elongate member further comprises a first and second terminal end with buttons positioned thereon, and having spaced apart sealing members for water tightly sealing between the elongate member and the bore in the body portion, the sealing members including a first terminal sealing member located near the first terminal end, a second terminal sealing member located near the second terminal end, the untreated water control sealing member spaced away from the first terminal end, and the treated water inlet control sealing member spaced away from the second terminal end, and wherein sections of the elongate member bridging between the first terminal sealing member and the untreated water control sealing member and bridging between the second terminal sealing member and the treated water inlet control sealing member have a smaller profile than the diameter of the bore in the body portion, and wherein a section of the elongate member bridging between the untreated water control sealing member and the treated water inlet control sealing member have a smaller profile than the diameter of the bore in the body portion.

10. The sliding diverter valve of claim 9, wherein the sliding diverter valve is moved between the first, untreated water position and the second, treated water position by pushing on the buttons at the first terminal end and at the second terminal end, respectively.

11. The sliding diverter valve of claim 9, further comprising hose fittings positioned at the untreated water diverter outlet and at the treated water inlet.

12. The sliding diverter valve of claim 9, further comprising a threaded spigot attachment ring.

* * * * *